United States Patent Office 3,223,215
Patented Dec. 14, 1965

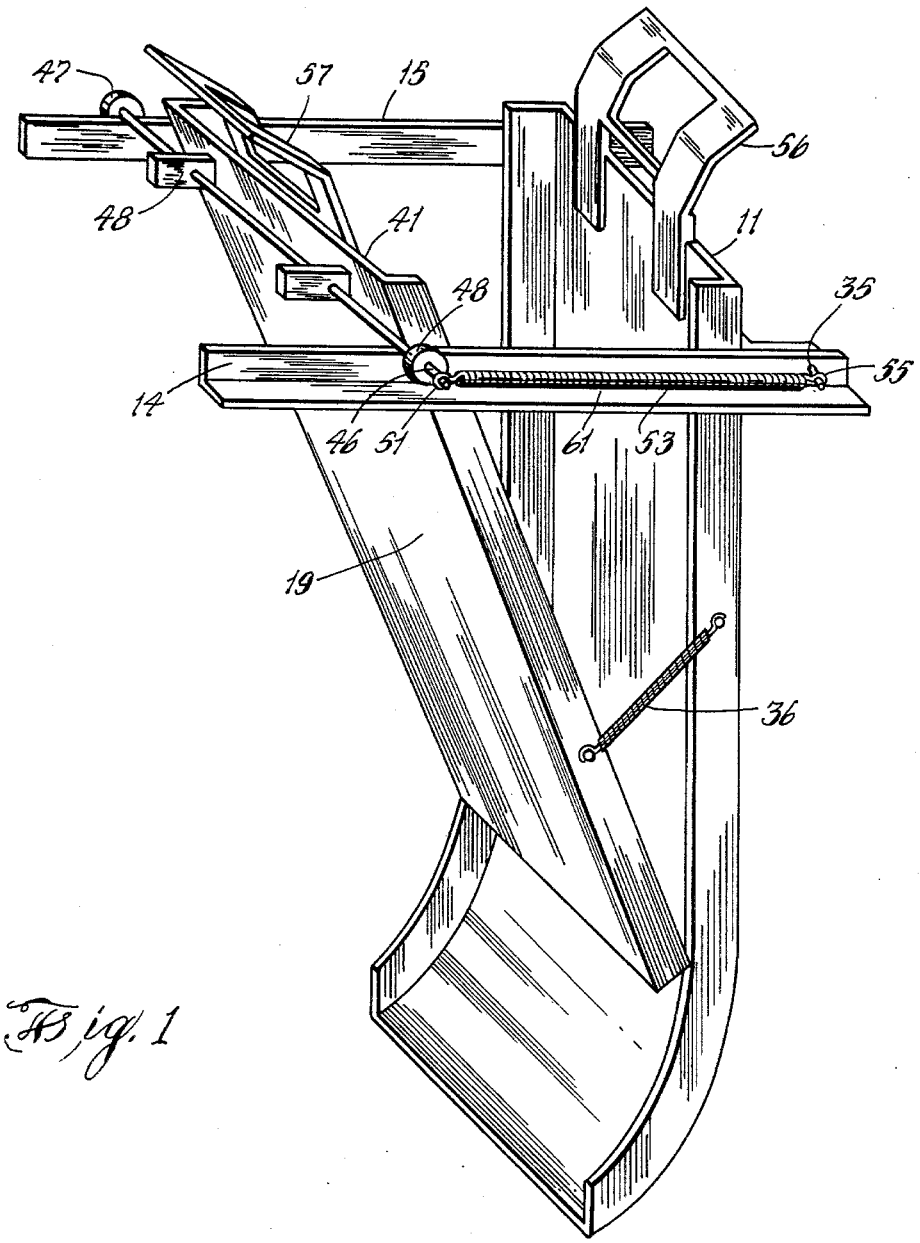

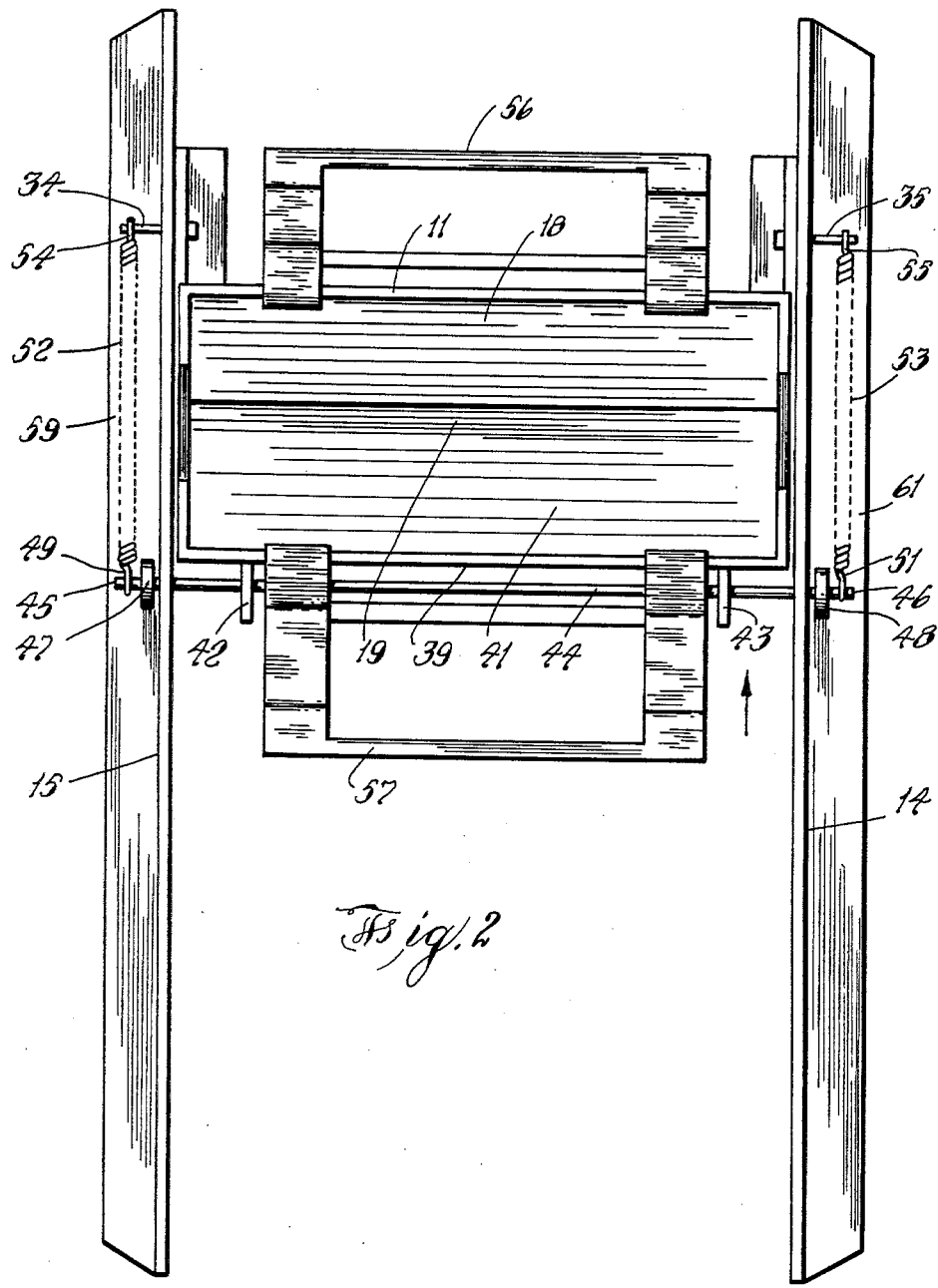

1

3,223,215
GRAVITY CONVEYORS
Aloysius N. Budjinski, Roselle, and James D. Georgia, Jersey City, N.J., assignors to the United States of America as represented by the Secretary of the Navy
Original application Aug. 10, 1962, Ser. No. 216,709. Divided and this application Jan. 26, 1965, Ser. No. 428,277
2 Claims. (Cl. 193—32)
(Granted under Title 35, U.S. Code (1952), sec. 266)

This is a division of our copending application Serial No. 216,709, filed August 10, 1962, now abandoned.

The invention described herein may be manufactured and used by or for the Government of the United States of America for governmental purposes without the payment of any royalties thereon or therefor.

This invention relates to improvements in conveying apparatus and particularly to gravity conveyors of improved construction for use in the substantially vertical transfer of bulk articles from a delivery station to a discharge station.

The problem of cargo transfer, handling and storage aboard ship is of particular interest to the Navy. One phase of the problem, the vertical transfer of bulk cargo such as packages, boxes, and the like, from one deck to another deck that is at a lower level, has a significant impact upon operations.

In the past, the packages desired to be transferred were merely placed on a trough-like chute and allowed to freely progress down the length of the chute to the discharge station by gravitational forces. However, as the packages descended down the conveyor, they increased in acceleration and were usually traveling at a high speed upon arrival at the discharge station. In order to properly handle the packages, it was necessary to bring them to an abrupt halt. This was usually accomplished by allowing the speeding packages to come in headlong contact with a bulkhead, but, in many cases, the individual articles within the packages were damaged as a result of this treatment. As an alternative, attempts were made to bodily catch the indiivdual packages in their flight down the chute, but this was found to be physically dangerous to the operations personnel. Another approach was to provide the chute with an abrasive friction surface in an attempt to slow down the flight of the packages. However, this was found to be damaging to the outer protective covering of the package, and otherwise unsatisfactory.

We have invented a gravity conveyor of improved construction which can be used to vertically transfer cargo from an upper level to the cargo. The disadvantages heretofore encountered in the vertical transfer of cargo are substantially overcome by the present invention. It has been found that by controlling the speed of the vertically descending packages, the initial impact of the package upon arrival at the discharge station can be drammatically reduced, thus lessening the liability of the package to damage.

In general, the subject invention provides a gravity conveyor having an overhead spring actuated package retarding means for control of the speed of descending cargo such as packages, boxes and the like.

The principal object of the present invention is to provide a gravity conveyor of improved construction for use in the substantially vertical transfer of cargo from a supply station to a receiving station.

Another object is to provide a gravity conveyor of improved construction for use in the substantially vertical transfer of cargo aboard ship from a supply station to a receiving station.

2

A further object is to provide a gravity conveyor of improved construction of low fabrication and maintenance costs, high durability and facile in use under a wide variety of service conditions.

Other objects and many of the attendant advantages of this invention will be readily appreciated as the same becomes better understood by reference to the following detailed description when considered in connection with the accompanying drawings wherein:

FIG. 1 is a perspective view of one embodiment of the present invention;

FIG. 2 is a top plan view of the embodiment set forth in FIG. 1.

Similar numerals refer to similar parts throughout the several views.

Referring to FIGS. 1 and 2, the gravity-conveyor is provided with an elongated, flat, trough-like frame section 11 having upturned sidewalls 12, 13 in the form of a chute. The chute is secured in position between support members 14, 15 by means of extensions 32, 33 and revolvable mounts 34, 35 so that the width of the bed of the chute is transversely disposed between the supports 14, 15. The bed 18 of the chute is provided with an overhead pressure shoe 19, the upper portion of which is pivotally mounted between the two supporting elements in such a manner that the width of the pressure shoe 19 is transversely disposed between the supporting members 14, 15 from the bed 18 of the chute.

The lower portion of the pressure shoe 19, as described, is provided with springs 36 which function to force the lower end of the pressure shoe towards the lower portion of the bed of the chute 11. The pressure shoe is in the form of an inverted trough-like frame construction having dimensions similar to that of the chute 11 but it may be a flat, elongated section of smaller width than that of the chute.

As the package progresses down the length of the chute 11 by gravitational force, it encounters the snubbing action of the pressure shoe 19 which is held in position in proximity to the bed of the chute by means of the tension springs 36. The force excited by the descending package pushes the pressure shoe 19 in an outwardly direction and, as a result, each of the individual springs 36 are stretched and a compensating inward pressure is exerted by the pressure shoe 19 on the descending package. The more each of the springs 26, 27 is stretched by the action of the descending package, the greater is the inward pressure exerted by the shoe 19 on the descending package. The speed of the descending package may be reduced to a minimum or the package may be actually stopped in descent depending on the pressure of the shoe 19 and the latter pressure may be regulated through the use of tension springs 36 of variable strength. As long as the pressure due to the weight of the descending package is greater than the pressure exerted by the shoe 19, the package will continue to descend down the length of the chute. It is possible, however, to retard the speed of various size packages through the use of tension springs 36 of variable strength. The spring tensioning means are easily interchanged and the apparatus is quickly adaptable to precise control over a range of lead conditions.

The apparatus, as described, may be used as a single unit to retard the speed of descending packages or several units may be placed in sequence with or without intermediate chutes of ordinary construction resulting in an increase in the overall length of the operating chute.

The lower end portion of the chute 11 and the pressure shoe extend in an upwardly direction to facilitate transit of packages from the chute 11 to a receiving conveyor or discharge station.

A "floating type" pressure shoe is set forth in FIGS. 1 and 2. In this instance, the outer surface 39 of the pressure shoe 19 along the upper portion 41 thereof is provided with extensions 42, 43 through which extends axle 44 so that it is transversely disposed across supporting arms 14, 15. The end portions 45, 46 of the axle 44 are provided with wheels 47, 48 which revolve on tracks extending along the outer longitudinal edge of supporting arms 14, 15 in the form of lips. The extremital ends 49, 51 of tension springs 52, 53 are secured to the end portions 45, 46 of axle 44 adjacent wheels 47, 48 and the opposite ends 54, 55 of the same springs 52, 53 are secured to revolvable mounts 34, 35. In this matter the upper portion 41 of the pressure shoe is forced towards the bed 18 of the chute 11 by the restraining action of the tension springs 52, 53. As shown in FIG. 3, a package may be inserted between the receiver 56 on the chute and the receiver 57 on the pressure shoe 19 and the weight of the package will force the shoe 19 to progress away from the chute 18 on wheels 47, 48 along tracks 59, 61 allowing the package to enter the space between the chute 11 and the shoe 19. The restraining action of the upper portion 41 of the shoe 19 in combination with the restraining action of the lower portion, as heretofore described, will function to reduce the speed at which a package may descend along the longitudinal length of the chute.

Obviously, many modifications and variations of the present invention are possible in the light of the above teachings. For instance, the present invention has been described with particular reference to the vertical transfer of cargo from one deck to another aboard ship. However, it is to be understood that use is not limited to cargo transfer aboard ship, but that the invention has salutary advantages when employed in a use where either or both of the supply and receiving stations are shore stations. It is therefore to be understood that within the scope of the appended claims, the invention may be practiced otherwise than as specifically described.

We claim:
1. A gravity conveyor comprising, in combination:
dual aligned frame members having longitudinal raceways,
a chute having a channel-like bed mounted between said frame members,
a pressure shoe having an upper portion movably mounted on said raceways,
a tensioning means maintaining the lower portion of said shoe in pressed relationship with the lower portion of said chute.
2. A gravity conveyor comprising, in combination:
dual aligned elongated frame members;
a chute having channel-like bed transversely disposed between said frame members;
a raceway along the longitudinal length of each of said frame members;
a bar transversely disposed across said frame members;
a wheel journalled on each of the end portions of said bar; said wheels revolvably mounted on said raceways;
a pressure shoe having an upper portion pivotally mounted on said bar overhead the bed of said chute;
a primary spring securing said bar to said raceway thereby maintaining the upper portion of said shoe in pressed relationship with the upper portion of said chute; and
a secondary spring maintaining the lower portion of said shoe in pressed relationship with the lower portion of said chute.

References Cited by the Examiner
UNITED STATES PATENTS

| 1,879,944 | 8/1932 | Muth | 193—32 |
| 2,925,162 | 2/1960 | Tuncq | 193—7 |

SAMUEL F. COLEMAN, *Primary Examiner.*